(12) United States Patent
Ishimoto et al.

(10) Patent No.: US 8,833,849 B2
(45) Date of Patent: Sep. 16, 2014

(54) VEHICLE SEAT

(75) Inventors: Manabu Ishimoto, Toyota (JP); Keisuke Ishizaki, Nishio (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 363 days.

(21) Appl. No.: 12/867,915

(22) PCT Filed: Feb. 19, 2009

(86) PCT No.: PCT/IB2009/000295
§ 371 (c)(1),
(2), (4) Date: Aug. 17, 2010

(87) PCT Pub. No.: WO2009/104077
PCT Pub. Date: Aug. 27, 2009

(65) Prior Publication Data
US 2011/0006580 A1     Jan. 13, 2011

(30) Foreign Application Priority Data
Feb. 19, 2008  (JP) ................. 2008-037502

(51) Int. Cl.
*B60N 2/42*    (2006.01)
*B60N 2/68*    (2006.01)

(52) U.S. Cl.
CPC ......................... *B60N 2/68* (2013.01)
USPC .............. 297/216.1; 297/216.13; 297/452.18; 297/463.1

(58) Field of Classification Search
USPC .................. 297/216.1, 216.13, 452.18, 463.1
See application file for complete search history.

(56) References Cited

U.S. PATENT DOCUMENTS

| | | | | |
|---|---|---|---|---|
| 1,981,212 A | * | 11/1934 | Zeller | 297/65 |
| 3,873,055 A | * | 3/1975 | White | 248/564 |
| 4,235,471 A | * | 11/1980 | Tengler | 297/364 |
| 4,936,527 A | * | 6/1990 | Gorges | 244/118.6 |
| 5,836,648 A | * | 11/1998 | Karschin et al. | 297/216.14 |
| 6,216,833 B1 | * | 4/2001 | Lefferts et al. | 188/380 |
| 6,237,889 B1 | * | 5/2001 | Bischoff | 248/622 |
| 6,386,528 B1 | * | 5/2002 | Thorn et al. | 267/201 |
| 7,103,937 B2 | * | 9/2006 | Weng | 16/273 |
| 7,131,786 B2 | * | 11/2006 | Domange et al. | 403/366 |

(Continued)

FOREIGN PATENT DOCUMENTS

| | | |
|---|---|---|
| DE | 10327770 A1 | 1/2005 |
| FR | 2849814 A1 | 7/2004 |

(Continued)

OTHER PUBLICATIONS

Office Action issued Mar. 23, 2012 in Chinese Patent Application No. 200980105781.8 and English language translation thereof.

*Primary Examiner* — Laurie Cranmer
(74) *Attorney, Agent, or Firm* — Gifford, Krass, Sprinkle, Anderson & Citkowski, P.C.

(57) ABSTRACT

A vehicle seat (10) is equipped with a seat frame composed of a sub-frame (16) and a rod (30) provided between certain regions of the sub-frame. The rod is equipped with a minor vibration damping portion (34) that maintains rigidity of the seat frame when the seat frame is displaced by a large amount and suppresses an increase in rigidity of the seat frame when the seat frame is displaced by a small amount to reduce the level of minor vibrations in the vehicle seat.

10 Claims, 19 Drawing Sheets

(56) References Cited

U.S. PATENT DOCUMENTS

| | | | |
|---|---|---|---|
| 7,232,188 B2 * | 6/2007 | Runde | 297/410 |
| 7,354,409 B2 * | 4/2008 | Popescu | 601/86 |
| 7,878,570 B2 | 2/2011 | Endo et al. | |
| 7,922,157 B2 * | 4/2011 | Hayashi et al. | 267/141.2 |
| 8,091,675 B2 * | 1/2012 | Endo et al. | 180/273 |
| 2003/0218287 A1 * | 11/2003 | Mikami et al. | 267/293 |
| 2005/0161980 A1 * | 7/2005 | Rashidy et al. | 296/193.02 |

FOREIGN PATENT DOCUMENTS

| | | | |
|---|---|---|---|
| JP | 11278128 A | | 10/1999 |
| JP | 2011278128 A | | 10/1999 |
| JP | 2001211960 A | | 8/2001 |
| JP | 2006027554 A | | 2/2006 |
| JP | 2008285103 A | | 11/2008 |
| JP | 2012096744 A | * | 5/2012 |
| WO | 2006011597 A1 | | 2/2006 |
| WO | WO-2007094707 A1 | | 8/2007 |

\* cited by examiner

VEHICLE SEAT

CROSS-REFERENCE TO RELATED APPLICATIONS

This application is the U.S. National stage of PCT/IB2009/000295 filed on Feb. 19, 2009 which claims the benefit of JP2008-037502 filed on Feb. 19, 2008, both of which are hereby incorporated by reference.

BACKGROUND OF THE INVENTION

1. Field of the Invention

The invention relates to a vehicle seat having a rod provided between certain regions of the seat frame.

2. Description of the Related Art

A seat having a vibration damping member hung across a seat frame constituting a seatback to reinforce the seat frame is described in Japanese Patent Application Publication No. 2001-211960 (JP-A-2001-211960). The resistance of the seat to vibrations is improved by reinforcing the seat frame.

However, according to JP-A-2001-211960, the increased rigidity of the seat frame resulting from the vibration damping member suppresses minor displacement or minor deformation of the seat frame itself and thus increases the resonance frequency of the seat. As a result, the seat vibrates sympathetically with the vehicle, which aggravates vibrations. In some cases, this may reduce the seating comfort of the seat.

SUMMARY OF THE INVENTION

The invention provides a vehicle seat that ensures sufficient rigidity when the vehicle seat is displaced by a large amount and that reduces sympathetic vibration of the seat with a vehicle, which may aggravate vibration of the seat in a minor displacement range.

A vehicle seat according to a first aspect of the invention includes a seat frame composed of a sub-frame and a rod provided between certain regions of the sub-frame. The vehicle seat has a minor vibration damping portion that is provided on the rod to maintain rigidity of the seat frame when the seat frame is displaced by a large amount and to suppress increases in rigidity of the seat frame when the seat frame is displaced by a small amount and thus reduce a level of minor vibrations.

The minor vibration damping portion ensures sufficient rigidity of the seat frame when the seat frame is displaced by the large amount (in a major displacement rage) in the event of a collision or the like and reduces the level of minor vibrations of the vehicle seat when the seat frame is displaced by the small amount (in a minor displacement rage). Further, the rigidity of the seat frame is restrained from increasing in the minor displacement range, and the resonance frequency of the vehicle seat is thereby restrained from increasing. Therefore, the vehicle seat can be restrained from vibrating sympathetically with a vehicle to cause aggravated vibrations.

In a second aspect of the invention, the minor vibration damping portion may be constructed such that the rod and the sub-frame or intermediate portions of the rod are spaced apart from each other in the minor displacement range, and that the rod and the sub-frame or the intermediate portions of the rod directly or indirectly abut on each other in the major displacement range.

According to the second aspect of the invention, in the minor displacement range, the rod and the sub-frame or the intermediate portions of the rod are spaced apart from each other. When the seat frame is displaced by the small amount, a region between the rod and the sub-frame or the intermediate portions of the rod absorbs the displacement of the seat frame. The level of minor vibrations can thereby be absorbed. Further, the resonance frequency of the vehicle seat is restrained from rising. Therefore, the vehicle seat may be prevented from vibrating sympathetically with the vehicle. Thus, in the minor displacement range, aggravation of the vibration of the vehicle seat may be restrained. On the other hand, in the major displacement range, the rod and the sub-frame or the intermediate portions of the rod directly or indirectly abut on each other. Thus, sufficient rigidity of the seat frame may thereby be ensured.

A third aspect of the invention is obtained by modifying the second aspect of the invention. In the third aspect of the invention, the minor vibration damping portion may be constructed as an elastic body interposed between the rod and the sub-frame or between the intermediate portions of the rod.

According to the third aspect of the invention, when the seat frame is displaced by a small amount, displacement of the seat frame is absorbed through deformation of the elastic body. The level of minor vibrations can thereby be reduced. Further, the resonance frequency of the vehicle seat is prevented from increasing. Therefore, the vehicle seat is prevented from vibrating sympathetically with the vehicle. Thus, in the minor displacement range, the vehicle seat is effectively restrained from vibrating sympathetically with the vehicle, which may aggravate vibration of the seat. However, if the seat frame is displaced by an amount that cannot be absorbed through deformation of the elastic body (in the event of a collision or the like), the elastic body is deformed to its limit or ruptured, and the rod and the sub-frame or the intermediate portions of the rod directly or indirectly abut on each other. Sufficient rigidity of the seat frame is thereby ensured.

A fourth aspect of the invention is obtained by modifying the second aspect of the invention. In the fourth aspect of the invention, the minor vibration damping portion may be constructed such that the rod is cantilevered with a clearance provided between a tip of the rod and the sub-frame or between the intermediate portions of the rod.

According to the fourth aspect of the invention, when the seat frame is displaced by a small amount, the clearance increases or decreases to absorb the displacement of the seat frame. The level of minor vibrations is thereby reduced. Further, the resonance frequency of the seat is restrained from increasing. Therefore, the seat is prevented from vibrating sympathetically with the vehicle. Thus, in the minor displacement range, vibration of the vehicle seat may be effectively restrained from vibrating sympathetically with the vehicle. However, if the seat frame is displaced by an amount that cannot be absorbed by the clearance (in the event of a collision or the like), the tip of the rod and the sub-frame or the intermediate portions of the rod abut on each other. Sufficient rigidity of the seat frame may thereby be ensured.

A fifth aspect of the invention is obtained by modifying the third aspect of the invention. In the fifth aspect of the invention, the sub-frame may be equipped with a rod-receiving portion that receives at least one end of the rod, and the elastic body may be sandwiched between the end and the rod-receiving portion.

According to the fifth aspect of the invention, when the seat frame is displaced by a small amount, displacement thereof is absorbed through deformation of the elastic body. The level of minor vibrations can thereby be reduced. On the other hand, if the seat frame is displaced by an amount that the displacement of the seat frame cannot be absorbed through deformation of the elastic body (in the event of a collision or the like), the elastic body is deformed to its limit or ruptured, and the end of the rod directly or indirectly abuts on the rod receiving portion. In this case, the rod-receiving portion is provided to make it easy for the end of the rod to abut on the rod-receiving portion. Thus, sufficient rigidity of the seat frame is effectively ensured.

A sixth aspect of the invention is obtained by modifying the fourth aspect of the invention. In the sixth aspect of the invention, the sub-frame may be equipped with a rod-receiving portion that receives at least one end of the rod, and the clearance may be formed between the end and the rod-receiving portion.

According to the sixth aspect of the invention, the clearance is formed between at least one end of the rod and the rod-receiving portion for receiving this end. When the seat frame is displaced by a small amount, the clearance increases or decreases to absorb the displacement of the seat frame. The level of minor vibrations is thereby reduced. However, if the seat frame is displaced by such an amount that displacement thereof cannot be absorbed by the clearance (in the event of a collision or the like), the end of the rod directly or indirectly abuts on the rod-receiving portion. In this case, the rod-receiving portion is provided to make it easy for the end of the rod to abut on the rod-receiving portion. Thus, sufficient rigidity of the seat frame may be effectively ensured.

A seventh aspect of the invention is obtained by modifying the fifth or the sixth aspect of the invention. In the seventh aspect of the invention, the rod-receiving portion may be equipped with an erected portion that is erected from the sub-frame to surround the periphery of the rod.

According to the seventh aspect of the invention, the rod-receiving portion is equipped with the erected portion, which is erected from the sub-frame to surround the periphery of the rod. If the seat frame is displaced by an amount that cannot be absorbed by the clearance (in the event of a collision or the like), the end of the rod directly or indirectly abuts on the erected portion. Thus, the abutment of the end of the rod and the erected portion on each other can be ensured, and the rigidity of the seat frame can be raised.

An eighth aspect of the invention is obtained by modifying the seventh aspect of the invention. In the eighth aspect of the invention, the erected portion may be equipped with a protrusion portion protruding inward, and the rod may be provided with a stopper to be meshed with the protrusion portion.

According to the eighth aspect of the invention, the erected portion is provided with the protrusion portion protruding inward, and the stopper provided on the rod is meshed with the protrusion portion in the major displacement range. Thus, the rigidity of the seat frame may further be increased in the major displacement range.

The vehicle seat according to any one of the foregoing aspects of the invention may be equipped with a seat cushion that supports the hips and thighs of a seated occupant, and a seatback provided on a seat rear end side of the seat cushion that supports the back of the seated occupant, the sub-frame may be provided on the seatback, and the rod may be disposed to extend between certain regions of the sub-frame in a width direction of a vehicle.

Thus, it is possible to ensure sufficient rigidity of the seat frame in the major displacement range in the event of a collision or the like and reduce the level of minor vibrations of the seat in the minor displacement range. Further, the rigidity of the seat frame is restrained from increasing in the minor displacement range, and the resonance frequency of the seat is thereby restrained from increasing. Therefore, the seat is restrained from vibrating sympathetically with the vehicle, which aggravates the vibration of the seat, and good seating comfort in the vehicle seat is achieved.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

The first embodiment of a vehicle seat according to the invention will be described hereinafter using FIGS. 1 to 6. The arrows FR, UP, and IN, shown in the figures denote the forward direction, the upward direction and a widthwise inward direction with respect to a vehicle, respectively. Throughout the following description, the arrows FR, UP, and IN will be referred to as the forward direction, the upward direction, and the inward direction, respectively.

Figure 1:
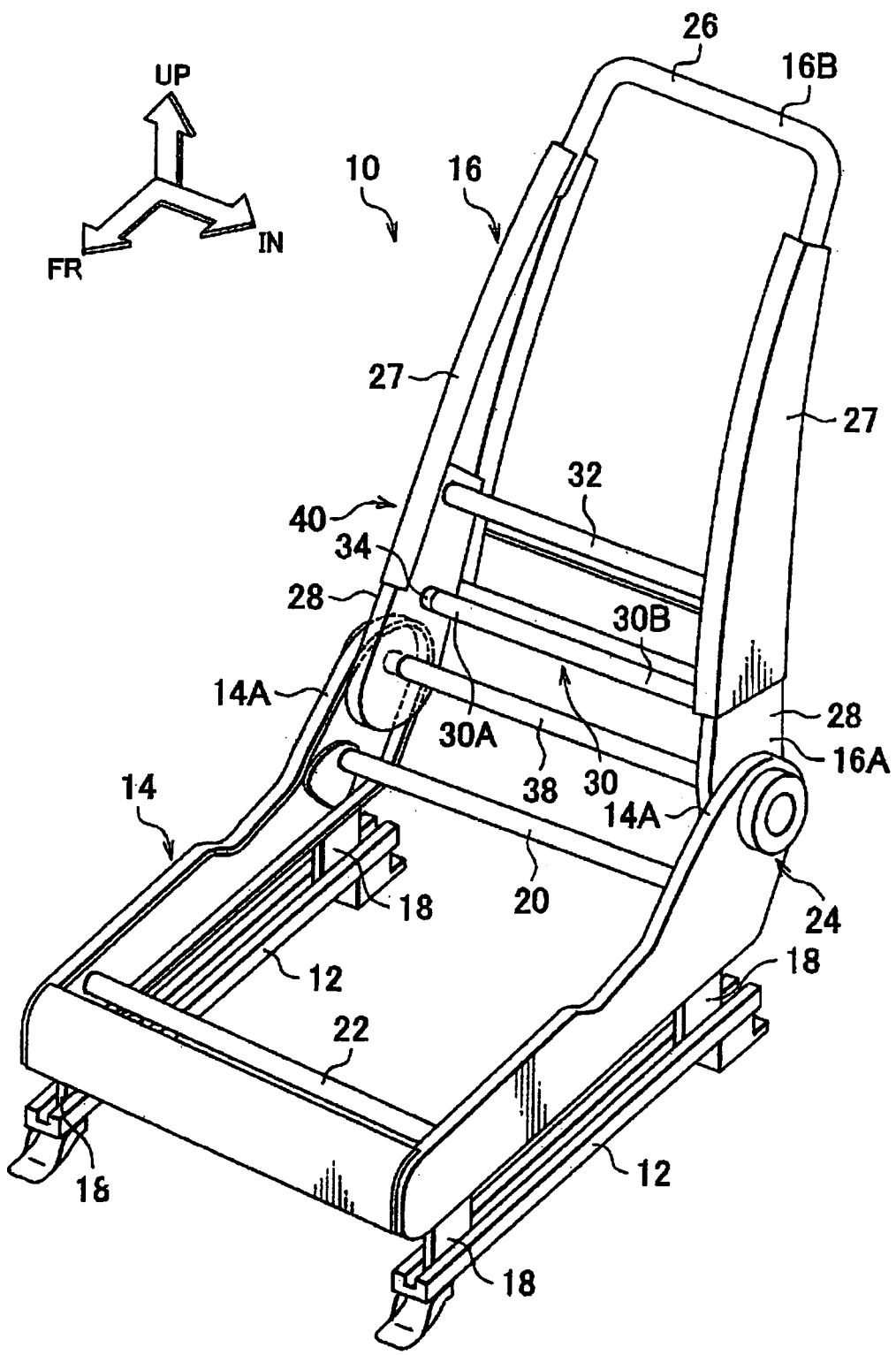
FIG. 1 is a perspective view of a vehicle seat according to the first embodiment of the invention.

FIG. 1 is a perspective view of a seat frame of the vehicle seat 10 as viewed from the front. As shown in FIG. 1, the vehicle seat 10 is installed on a pair of rails 12 disposed longitudinally in the floor of the vehicle body. The vehicle seat 10 is equipped with a seat cushion frame 14 disposed along the longitudinal direction, and a seatback frame 16 functioning as a sub-frame disposed above a rear end of the seat cushion frame 14. The seat cushion frame 14 constitutes a seat cushion (not shown) for supporting the hips and thighs of a seated occupant, and the seatback frame 16 constitutes a seatback (not shown) for supporting the seated occupant's back.

The seat cushion frame 14 is formed in a U-shape with a seat rear region of the seat cushion frame 14 open when viewed from above. The seat cushion frame 14 is provided at lower portions on either lateral portion thereof with a pair of a front lower arm 18 and a rear lower arm 18. When the lower arms 18 slide on the rails 12, the seat cushion frame 14 thereby slides in the longitudinal direction. A lifter rod 20 is disposed along a width direction between rear regions of the seat cushion frame 14. A front vertical rod 22 is disposed between front regions of the seat cushion frame 14. Rear ends 14A of the seat cushion frame 14 are extended backward and diagonally upward. Lower ends 16A of the seatback frame 16 are coupled to the rear ends 14A respectively via a reclining device 24.

The seatback frame 16 is disposed with an upper end 16B thereof slightly inclined backward with respect to the lower ends 16A thereof. The seatback frame 16 is formed in the shape of inverse U with a lower region thereof open as viewed from an area in front of the vehicle. The seatback frame 16 is composed of an upper frame 26, lateral frames 27, and lower frames 28. The upper frame 26 is disposed above, and generally assumes the shape of inverse U. The lateral frames 27 are coupled to both ends of the upper frame 26 respectively, and are disposed in the vertical direction. The lower frames 28 are coupled to lower regions of the lateral frames 27 respectively. The lateral frames 27 are formed to increase in width in the longitudinal direction as the distance from the lower regions thereof decreases, and both ends of each of the lateral frames 27 are bent generally in the shape of U. The lower frames 28 are joined to inner regions of the lower portions of the lateral frames 27 respectively. As is the case with the lower portions of the lateral frames 27, the lower frames 28 are formed with a great width in the longitudinal direction.

The reclining device 24 supports the seatback frame 16 such that the seatback frame 16 recline with respect to the seat cushion frame 14. A reclining rod 38 coupled to the shaft portions of the reclining device 24 is hung in the width direction between the lower frames 28 of the seatback frame 16. By turning the seatback frame 16 around shaft portions of the reclining device 24 in the longitudinal direction, the angle of inclination of the seatback frame 16 may be changed, and the seatback frame 16 may be locked at a desired angle by a locking mechanism (not shown).

A lower rod 30 and an upper rod 32, which are spaced apart from each other, are provided above the reclining rod 38 between the lower frames 28 of the seatback frame 16. The lower rod 30 and the upper rod 32 have a circular cross-section, and are arranged substantially parallel to each other along the width direction.

Figure 2:
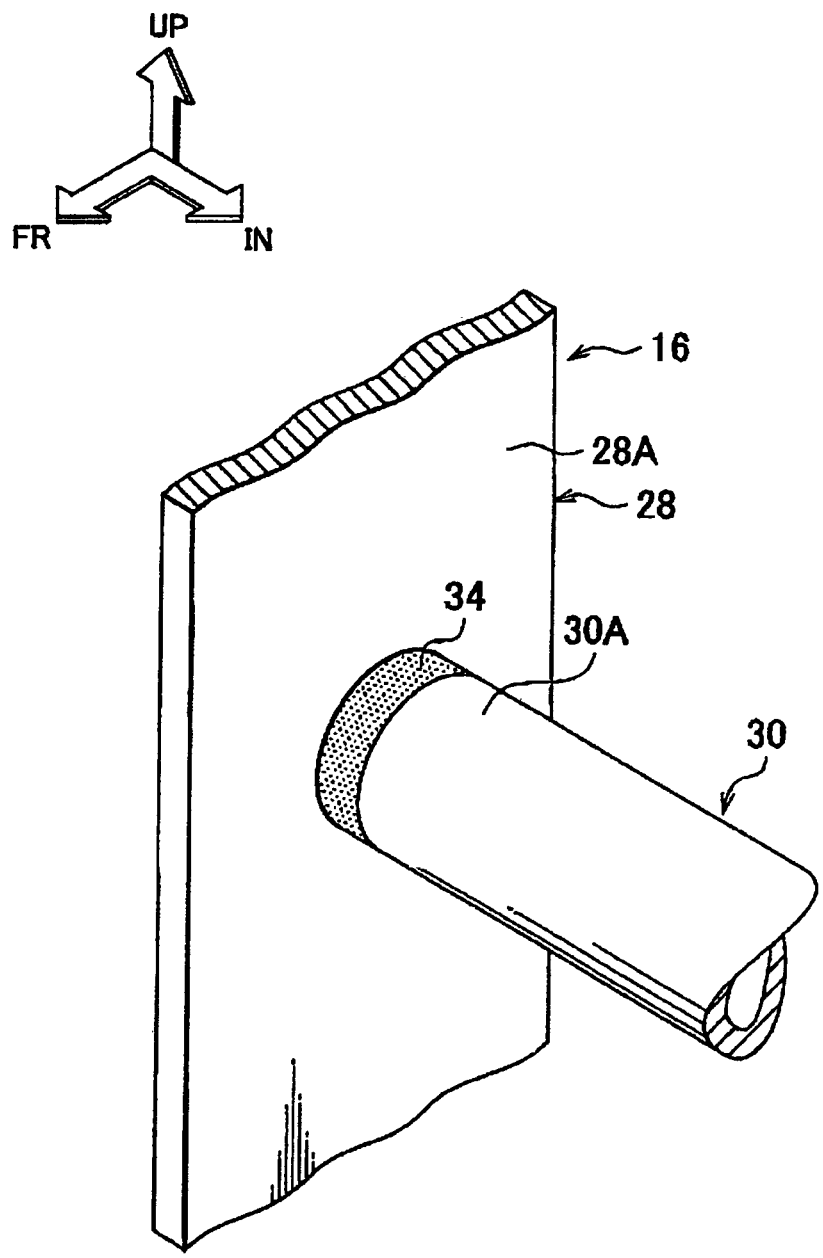
FIG. 2 is a perspective view showing a structure in which an elastic body is interposed between a rod and a lower frame of a seatback frame shown in FIG. 1.
Figure 3:
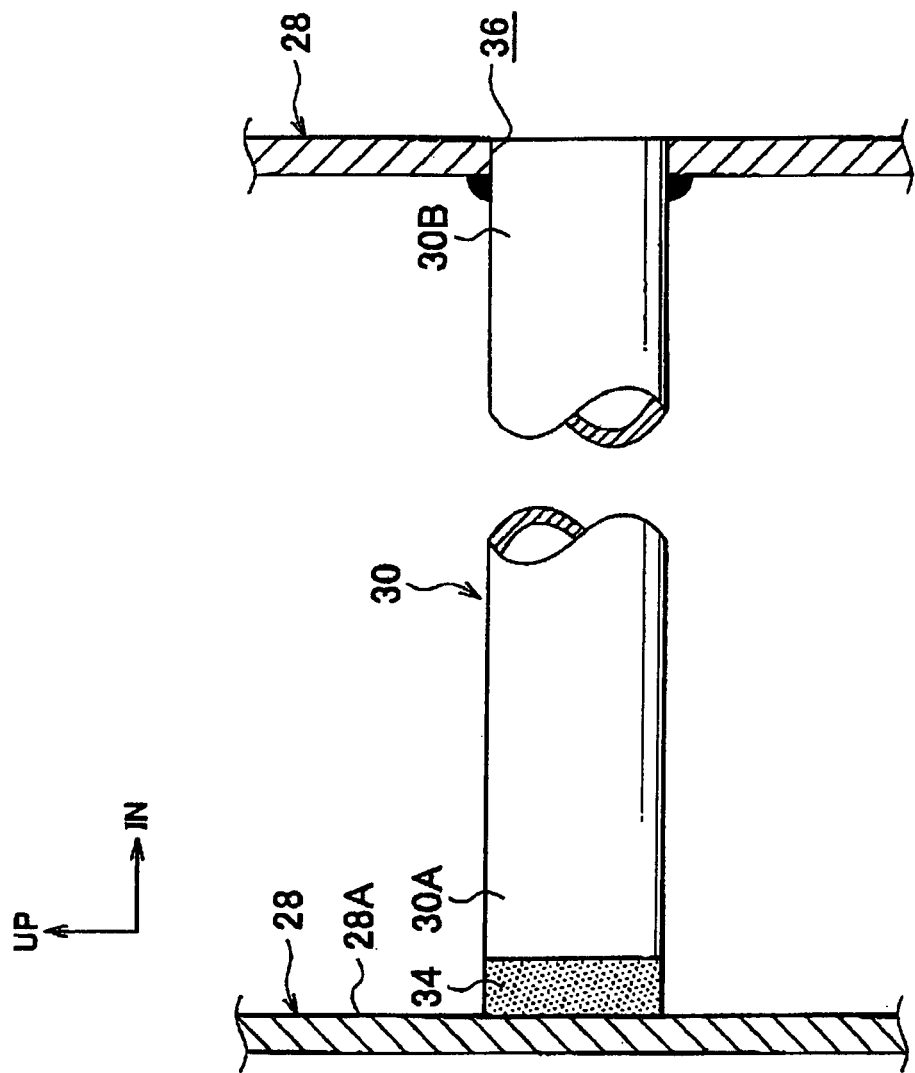
FIG. 3 is a longitudinal sectional view showing a structure in which the elastic body is interposed between the rod and the lower frame of the seatback frame shown in FIG. 1.

As shown in FIGS. 2 and 3, a cylindrical elastic body 34 is provided as the minor vibration damping portion and is interposed between one end 30A of the lower rod 30 in a longitudinal direction of the lower rod 30 (a left end of the lower rod 30 as viewed from an area in front of the vehicle) and an inner lateral face 28A of the lower frame 28. One end face of the elastic body 34 is firmly fixed to an end face of the end 30A of the lower rod 30, and the other end face of the elastic body 34 is firmly fixed to the inner lateral face 28A of the lower frame 28. For example, the end 30A of the lower rod 30 and the elastic body 34 are fixed to each other, and the elastic body 34 and the lower frame 28 are fixed to each other through pressure bonding fixation, an adhesive, or the like. Further, resin foam, rubber, or the like is used for the elastic body 34. A coiled spring or the like may also be used as the elastic body 34.

As shown in FIG. 3, a circular hole 36 having an inner diameter that is slightly larger than the outer diameter of the lower rod 30 is formed through the lower frame 28 on the right as viewed from the front of the vehicle. The other end 30B of the lower rod 30 is inserted in the circular hole 36 of the lower frame 28, and the region around the other end 30B of the lower rod 30 is fixed to the lower frame 28 through welding or the like.

Further, both ends of the upper rod 32 are inserted in circular holes (not shown) formed through the lower frames 28, and regions around both the ends of the rod 32 are fixed to the lower frames 28 through welding or the like. As shown in FIG. 1, the seatback frame 16 constructed as described above, the lower rod 30, the elastic body 34, the upper rod 32, and the like constitute a seat frame 40.

Next, the operation and effect of this embodiment of the invention will be described.

Figure 4:
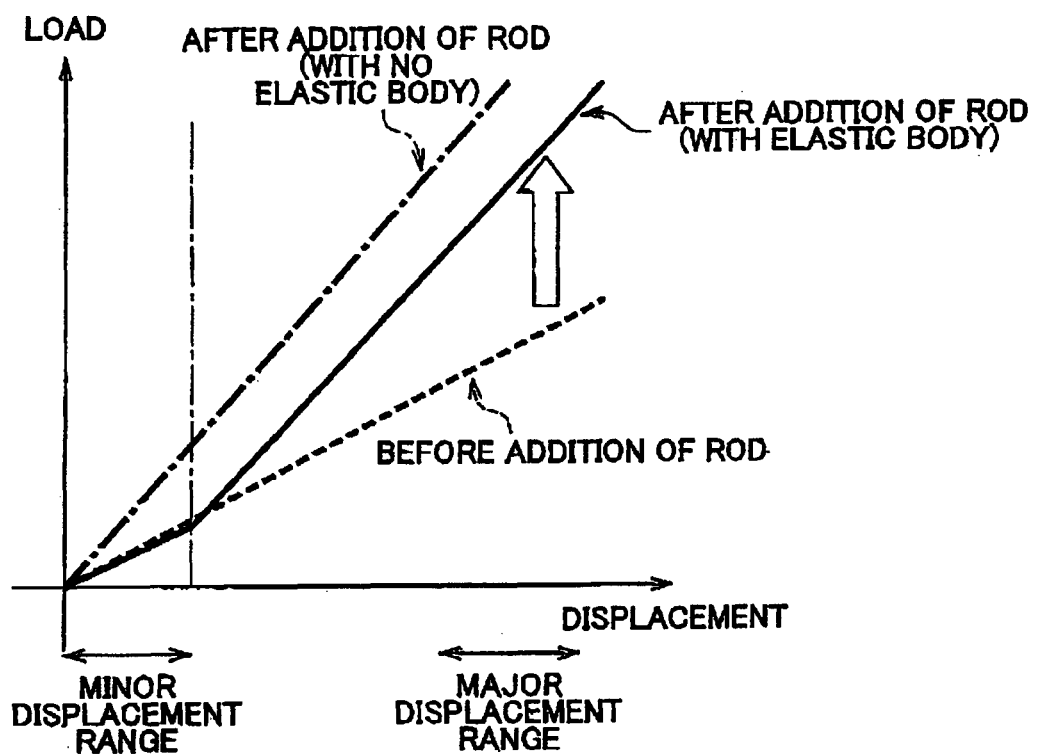
FIG. 4 is a graph showing a relationship between load and displacement in the vehicle seat.
Figure 5:
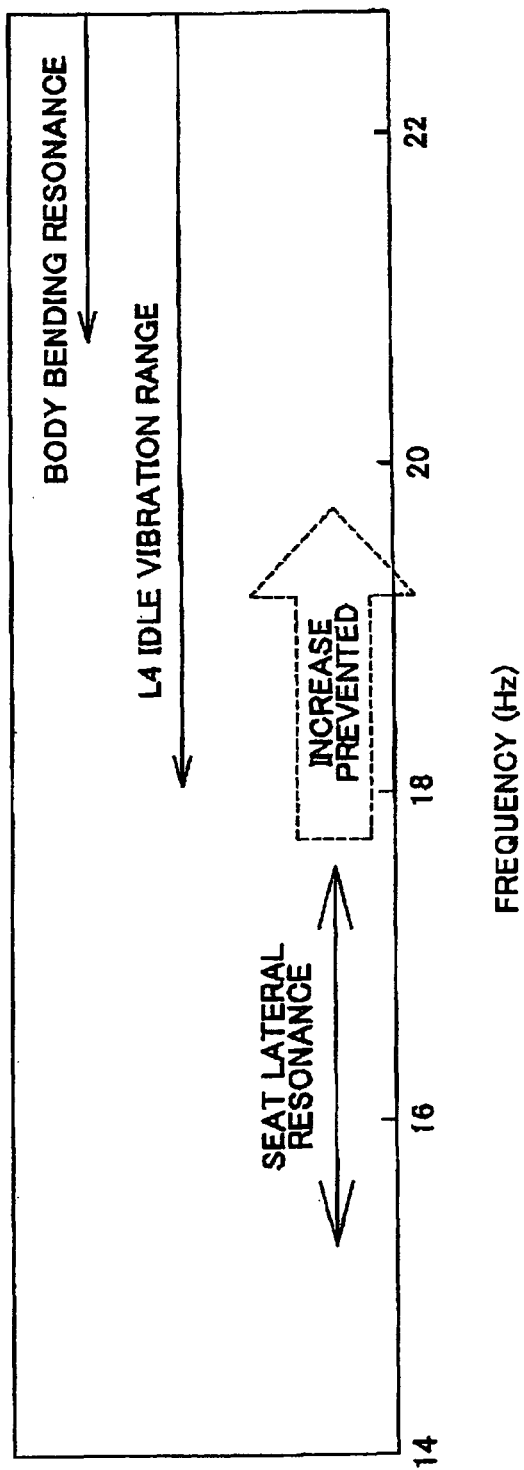
FIG. 5 is a view showing the distribution of resonance frequencies in the vehicle seat.

In the vehicle seat 10, the elastic body 34, which functions as a buffering portion, is interposed between the end 30A of the lower rod 30 and the lower frame 28. When the seat frame 40 is displaced by a small amount (in a minor displacement range), displacement thereof is absorbed through expansion and contraction of the elastic body 34, and the level of minor vibrations may be reduced. As shown in FIG. 4, in the minor displacement range, almost no increase in the rigidity of the seat frame 40 results from expansion and contraction of the elastic body 34 in comparison with a state prior to the addition of the rods (a vehicle seat provided with no rod or no elastic body), and the resonance frequency of the vehicle seat 10 is restrained from increasing. Thus, as shown in FIG. 5, lateral resonance of the vehicle seat 10 (right-and-left resonance in the width direction of the vehicle) is prevented from overlapping with an L4 idle vibration range or body bending resonance, and the vehicle seat 10 and the vehicle (not shown) are prevented from vibrating sympathetically with each other.

Thus, in the minor displacement range, the vehicle seat 10 can be restrained from vibrating sympathetically with the vehicle to cause aggravated vibrations.

Figure 6:
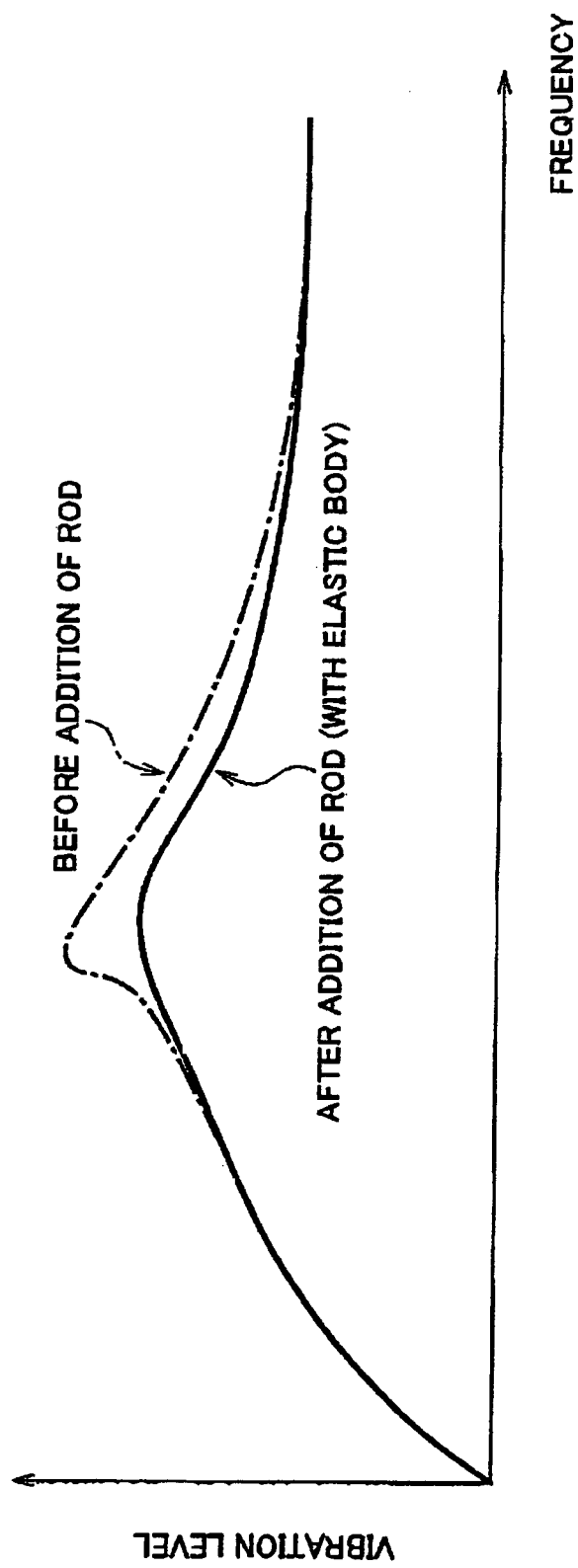
FIG. 6 is a graph showing a relationship between vibration level and frequency in the vehicle seat alone.

Furthermore, as shown in FIG. 6, in the vehicle seat 10 to which the rod 30 and the elastic body 34 are added, the level of vibrations of the vehicle seat 10 alone can be made lower than in the vehicle seat to which no rod or no elastic body is added. That is, by adding an effect of viscous damping or frictional damping through expanding/contracting deformation of the elastic body 34, the level of vibrations of the vehicle seat 10 alone is reduced, and the level of vibrations of the vehicle seat 10 alone may also be reduced as well.

On the other hand, when the seat frame 40 is displaced by an amount that cannot be absorbed through deformation of the elastic body 34 (in a major displacement range), for example, in the event of a collision or the like, the elastic body 34 is deformed to its limit or ruptured, and the end 30A of the lower rod 30 and the lower frame 28 directly or indirectly abut on each other (via the elastic body 34 deformed to its limit). Thus, the rigidity of the seat frame 40 may be increased in the major displacement range. That is, as shown in FIG. 3, in the major displacement range, the end 30A of the rod 30 and the lower frame 28 directly or indirectly abut on each other. Therefore, the prerequisites for strength and safety are improved.

Figure 7:
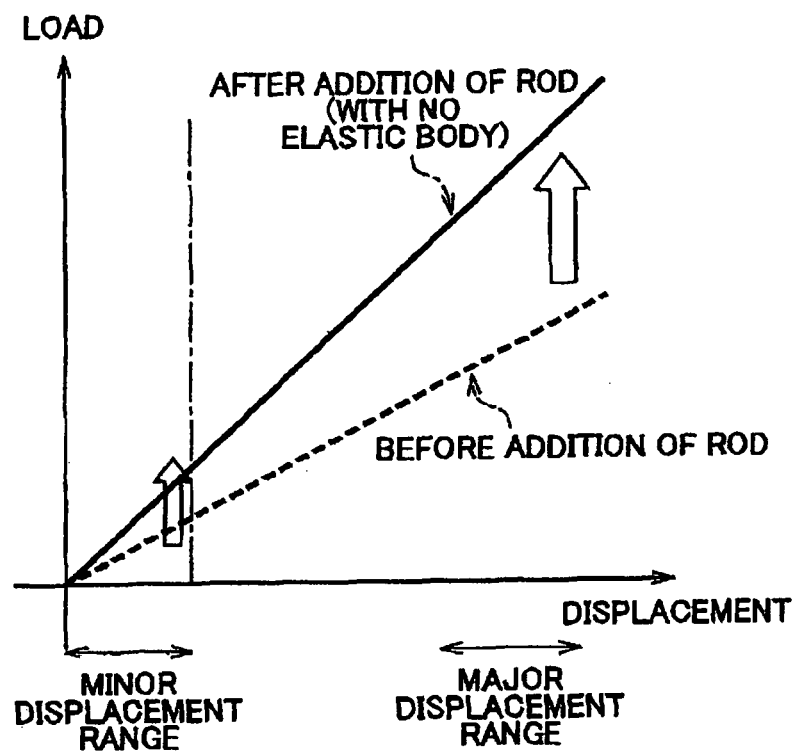
FIG. 7 is a graph showing a relationship between load and displacement in a vehicle seat according to a comparative example.
Figure 8:
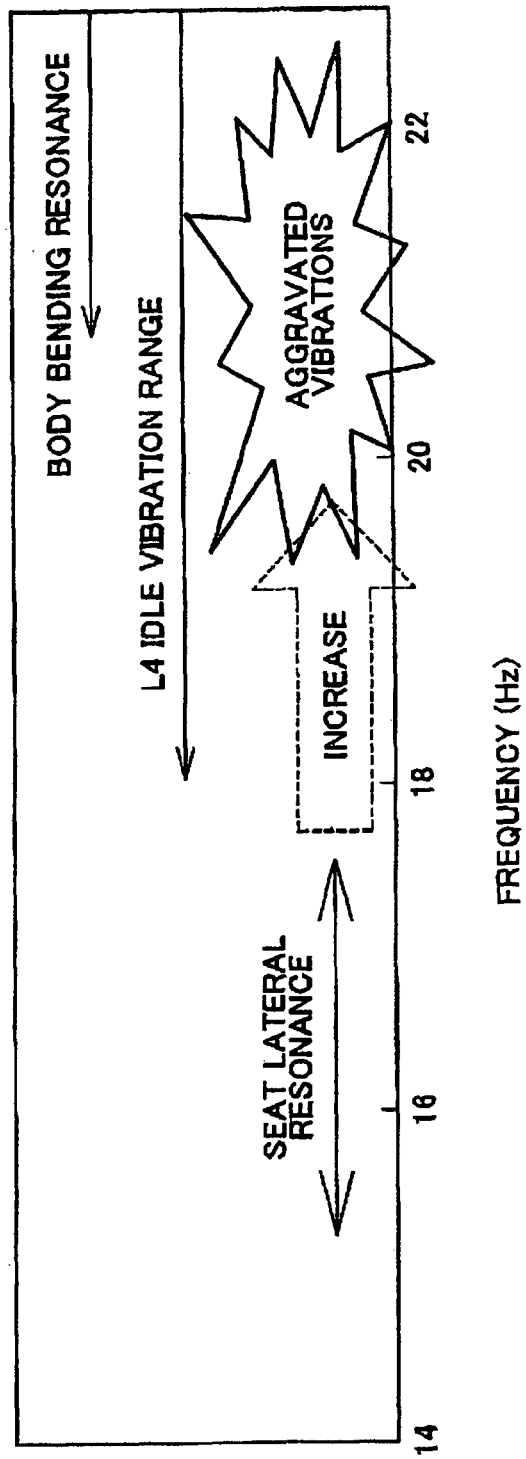
FIG. 8 is a view showing the distribution of resonance frequencies in the vehicle seat according to the comparative example.

Meanwhile, as shown in FIG. 7, by having the rod hung between the lower frames 28 of the vehicle seat instead of having the elastic body 34 interposed therebetween (the vehicle seat with both the ends of the rod fixed to the lower frames 28 respectively), the vehicle seat has a linear F-S line, and there is an increase in the rigidity of the vehicle seat in the minor displacement range as well as the major displacement range in comparison with the state when the rod is absent. Thus, as shown in FIG. 8 if lateral resonance of the vehicle seat overlaps with the L4 idle vibration range or body bending resonance, the vehicle seat will vibrate sympathetically with the vehicle, which aggravates vibration of the seat.

In view of the above, in this embodiment of the invention, lateral resonance of the vehicle seat 10 is prevented from overlapping with the L4 idle vibration range or body bending resonance, and the vehicle seat 10 is restrained from vibrating sympathetically with the vehicle. That is, the occurrence of aggravated vibrations during normal operation can be suppressed. Thus, it is possible to ensure both sufficient rigidity of the seat frame 40 in the major displacement range in the event of a collision or the like and a reduction in the level of minor vibrations of the vehicle seat 10 in the minor displacement range. Further, the vehicle seat 10 has a simple construction in which the elastic body 34, which functions as a buffering portion, is interposed between the end 30A of the rod 30 and the lower frame 28. Therefore, the vehicle seat 10 is easy to manufacture. Also, there is no increase in weight in comparison with a case where a dynamic vibration absorber is installed, and a reduction in cost is possible.

The second embodiment of the vehicle seat according to the invention will be described hereinafter using FIGS. 9 and 10. Components identical to those of the first embodiment of the invention will be denoted by the same reference numerals and will not be described below.

Figure 9A:
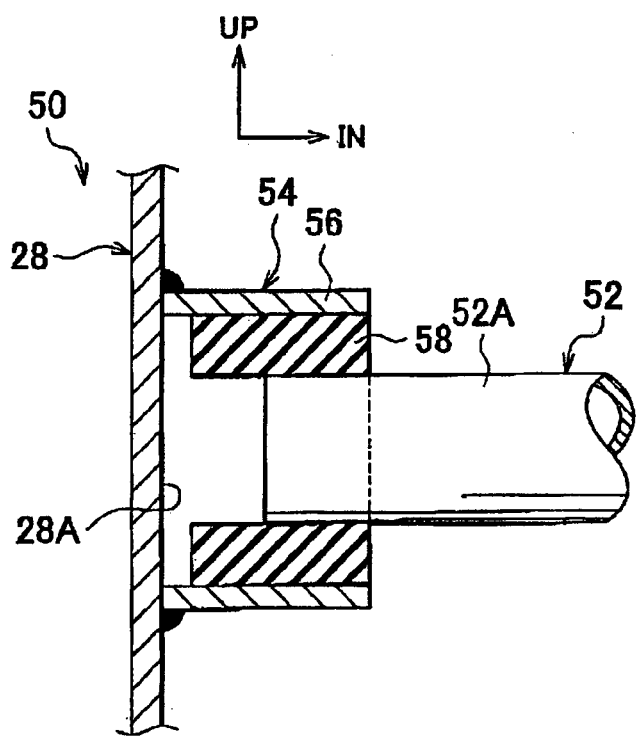
FIG. 9A is a longitudinal sectional view showing a structure of a rod receiving portion, a rod, and a lower frame of a seatback frame in a vehicle seat according to the second embodiment of the invention.
Figure 9B:
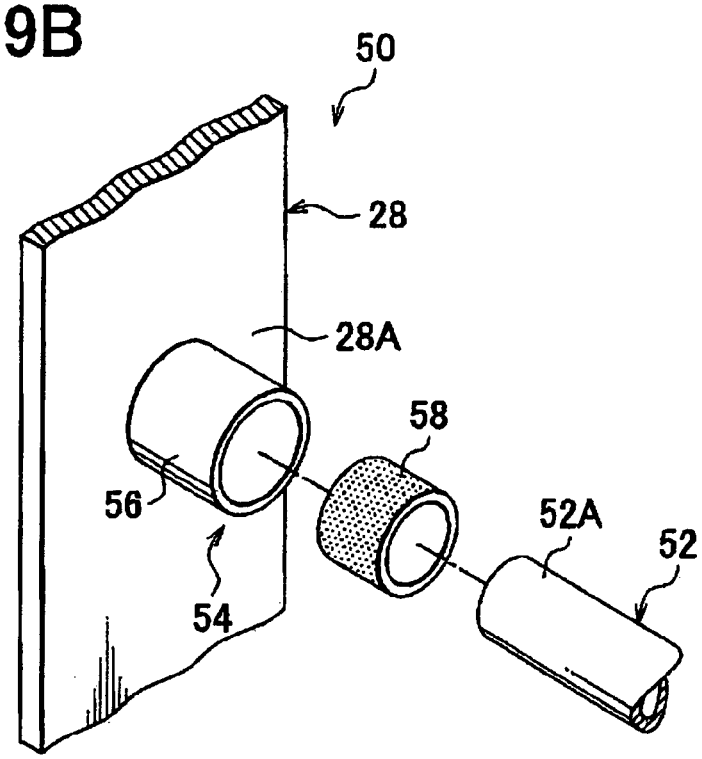
FIG. 9B is an exploded perspective view of the structure of the rod receiving portion, the rod, and the lower frame of the seatback frame in the vehicle seat according to the second embodiment of the invention.
Figure 10:
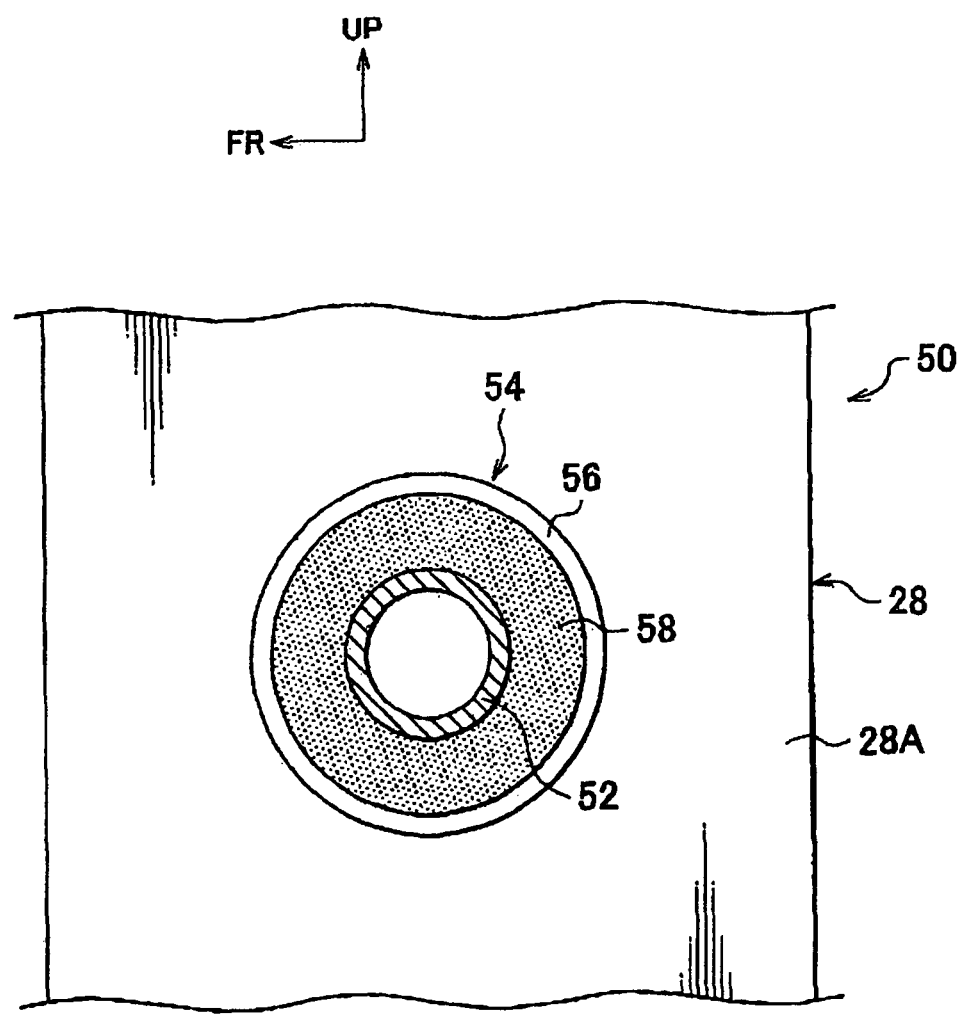
FIG. 10 is a lateral sectional view showing the structure of the rod receiving portion, the rod, and the lower frame of the seatback frame in a vehicle seat according to the second embodiment of the invention.

As shown in FIGS. 9 and 10, the lower frame 28 of a vehicle seat 50 is provided with a rod-receiving portion 54 that receives one end 52A of a rod 52. The rod-receiving portion 54 is composed of the inner lateral face 28A of the lower frame 28, and a cylindrical erected portion 56 erected from the inner lateral face 28A in the width direction of the vehicle. A lateral face of the erected portion 56 (a left lateral face in the width direction of the vehicle) is fixed to the inner lateral face 28A of the lower frame 28 through welding or the like. Further, a cylindrical elastic body 58 that serves as a minor vibration damping portion is firmly fixed to an inner peripheral face of the erected portion 56, and an outer peripheral face of the end 52A of the rod 52 is firmly fixed to an inner peripheral face of the elastic body 58. For example, the erected portion 56 and the elastic body 58 are fixed to each other, and the elastic body 58 and the end 52A of the rod 52 are fixed to each other through pressure bonding fixation, an adhesive, or the like. In other words, as shown in FIG. 10, a region around the end 52A of the rod 52 is surrounded by the cylindrical erected portion 56, and the elastic body 58 is interposed between the end 52A of the rod 52 and the erected portion 56. In this embodiment of the invention, the erected portion 56 is formed out of metal. Further, although there is a clearance formed between the lateral face of the elastic body 58 and the inner lateral face 28A of the lower frame 28 in this embodiment of the invention, it is also possible to adopt a construction in which there is no clearance is provided.

Next, the operation and effect of this embodiment of the invention will be described.

In the vehicle seat 50, the elastic body 58, which functions as a buffering portion, is interposed between the end 52A of the rod 52 and the erected portion 56 constituting the rod receiving portion 54. When the seat frame is displaced by a small amount (in the minor displacement range), the displacement of the seat frame is absorbed through shear deformation of the elastic body 58, and the level of minor vibrations may be reduced. That is, in the minor displacement range, almost no increase in the rigidity of the seat frame results from shear deformation of the elastic body 58, and the resonance frequency of the vehicle seat 50 is restrained from increasing. Thus, the vehicle seat 50 is prevented from vibrating sympathetically with the vehicle (not shown). As a result, vibration of the vehicle seat 50 is not aggravated.

Further, by adding an effect of viscous damping or frictional damping through shear deformation of the elastic body 58, vibration of the vehicle seat 50 may be reduced.

However, if the seat frame is displaced by an amount that cannot be absorbed through deformation of the elastic body 58 (in the major displacement range), the elastic body 58 is deformed to its limit or ruptured, and the end 52A of the rod 52 and the inner lateral face 28A of the lower frame 28 or the elected portion 56 directly or indirectly abut on each other (via the elastic body 58 deformed to its limit). In this case, through the provision of the rod-receiving portion 54, the direct or indirect abutment on the end 52A of the rod 52 is ensured. Thus, the rigidity of the seat frame may be increased in the major displacement range.

Thus, it is possible to ensure both sufficient rigidity of the seat frame in the major displacement range and a reduction in the level of minor vibrations of the vehicle seat 50 in the minor displacement range.

The third embodiment of a vehicle seat according to the invention will be described hereinafter using FIGS. 11 to 14. Components identical to those of the first or second embodiment of the invention will be denoted by the same reference numerals and will not be described below.

Figure 11:
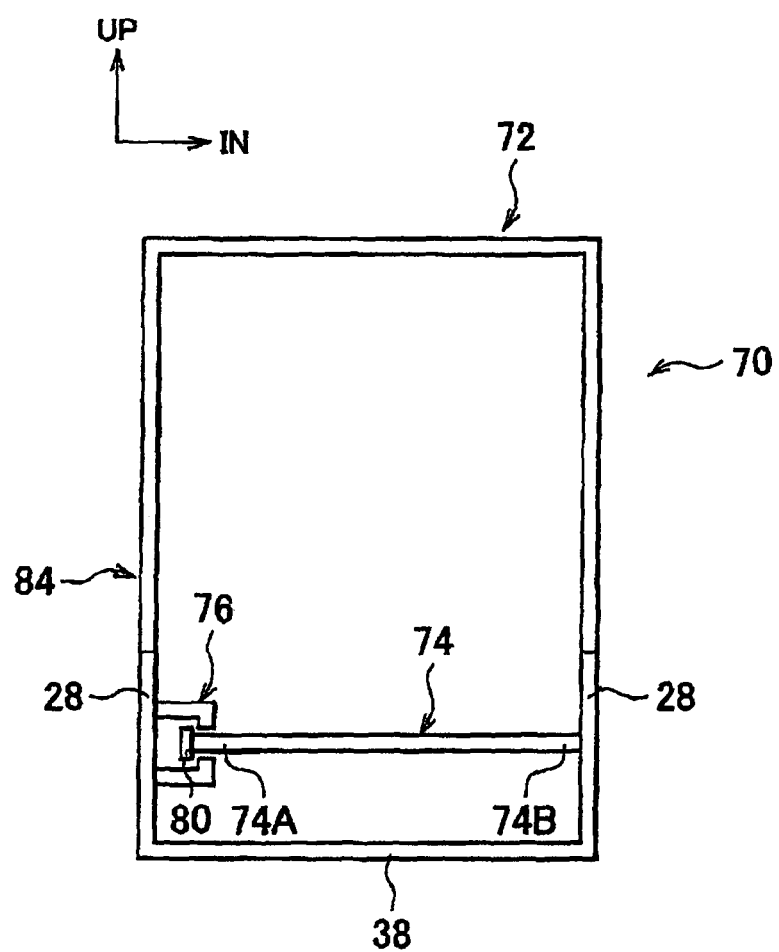
FIG. 11 is a front view showing a seat frame equipped with a rod and a seatback frame of a vehicle seat according to the third embodiment of the invention.
Figure 13:
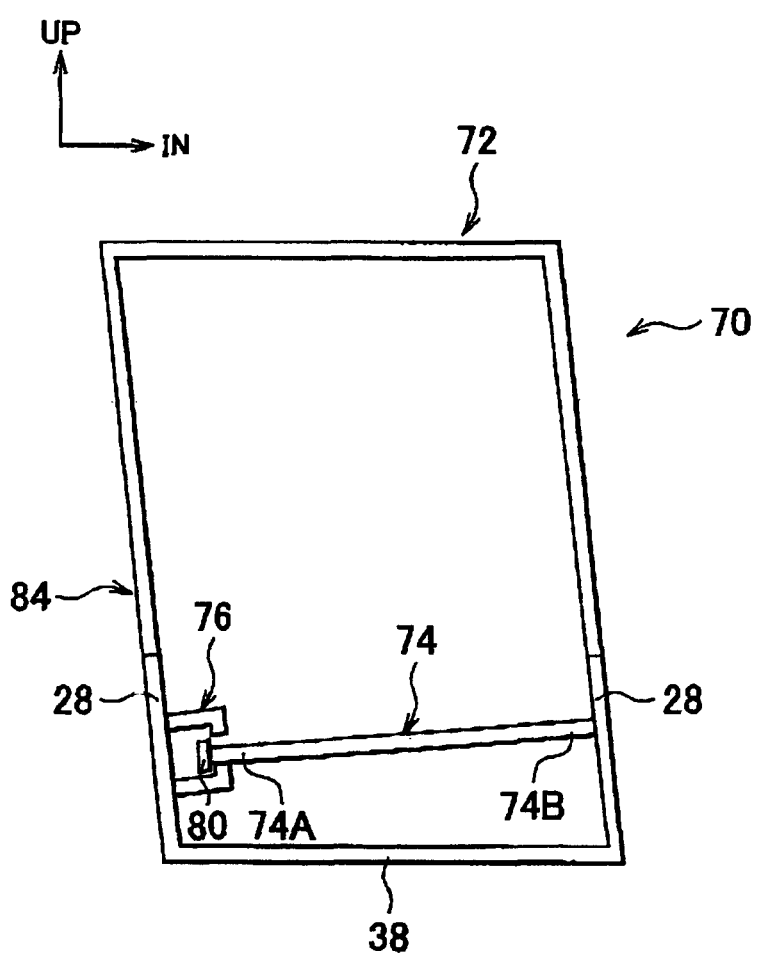
FIG. 13 is a front view showing a state of a rod and a seatback frame in a major displacement range.

FIGS. 11 and 13 schematically show a seat frame 84 composed of a rod 74, a seatback frame 72, and the like of a vehicle seat 70.

As shown in FIG. 11, the lower frame 28 of the seatback frame 72 is provided with the rod 74. One end 74A of the rod 74 is inserted in a rod-receiving portion 76 provided on the inner lateral face 28A of the lower frame 28, and the other end 74B of the rod 74 is fixed to the inner lateral face 28A of the lower frame 28 through welding or the like. The seat frame 84 is formed of the seatback frame 72, the rod 74, the rod-receiving portion 76, and the like, which are constructed as described above.

Figure 12A:
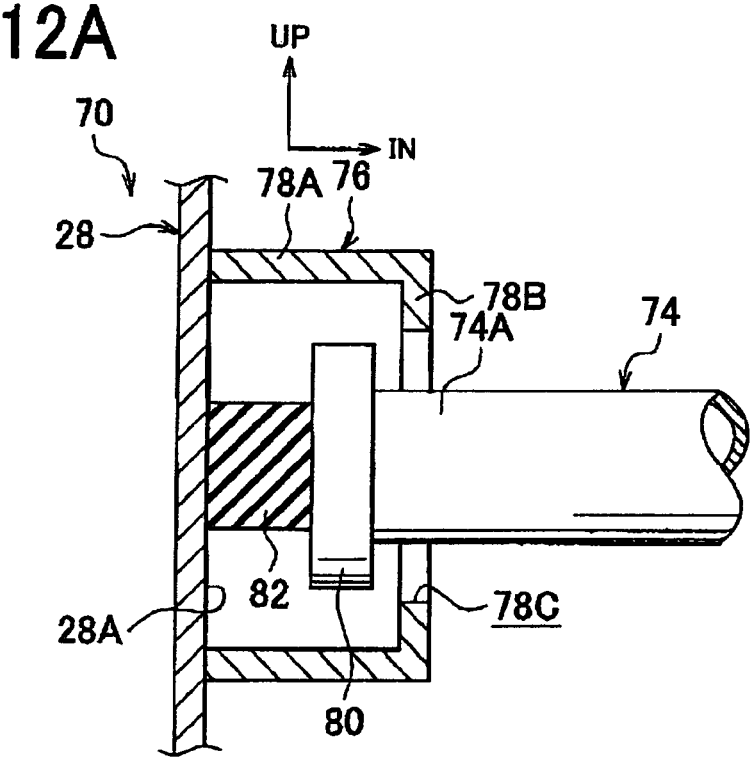
FIG. 12A is a longitudinal sectional view showing a structure of a rod receiving portion, the rod, and a lower frame of the seatback frame in the vehicle seat according to the third embodiment of the invention.
Figure 12B:
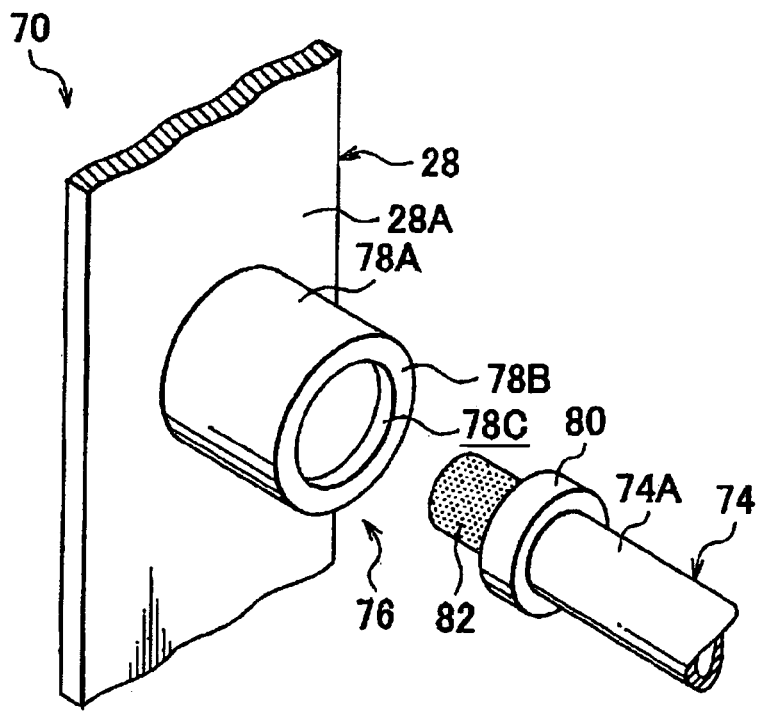
FIG. 12B is an exploded perspective view of the structure of the rod receiving portion, the rod, and the lower frame of the seatback frame in the vehicle seat according to the third embodiment of the invention.

As shown in FIG. 12, the rod receiving portion 76 is composed of the inner lateral face 28A of the lower frame 28, a cylindrical erected portion 78A erected from the inner lateral face 28A along the width direction of the vehicle, and a protrusion portion 78B protruding inward from a tip of the erected portion 78A. A circular opening portion 78C through which the end 74A of the rod 74 is inserted is formed through a central portion of the protrusion portion 78B. A lateral face of the erected portion 78A (a left lateral face thereof in the width direction of the vehicle) is fixed to the inner lateral face 28A of the lower frame 28 through welding or the like.

A stopper 80 constructed as a circular flange portion is provided on an end face of the end 74A of the rod 74 (a left end face thereof in the width direction of the vehicle). A cylindrical elastic body 82 that serves as a minor vibration damping portion is interposed between an end face of the stopper 80 and the inner lateral face 28A of the lower frame 28. The end face of the stopper 80 and the elastic body 82 are fixed to each other; and the elastic body 82 and the inner lateral face 28A of the lower frame 28 are fixed to each other through pressure bonding fixation, an adhesive, or the like. In this embodiment of the invention, the erected portion 78A and the protrusion portion 78B are formed out of metal.

Next, the operation and effect of this embodiment of the invention will be described.

In the vehicle seat 70, the elastic body 82, which functions as a buffering portion, is interposed between the stopper 80 provided at the end 74A of the rod 74 and the inner lateral face 28A of the lower frame 28. When the seat frame 84 is displaced by a small amount (in the minor displacement range), the displacement of the seat frame 84 is absorbed through expansion and contraction of the elastic body 82. As a result, the level of minor vibrations can be reduced. That is, in the minor displacement range, almost no increase in the rigidity of the seat frame results from expansion and contraction of the elastic body 82, and the resonance frequency of the vehicle seat 70 is restrained from increasing. Thus, the vehicle seat 70 may be prevented from vibrating sympathetically with the vehicle (not shown). As a result, the vehicle seat 70 is restrained from vibrating sympathetically with the vehicle to cause aggravated vibrations.

Further, by adding an effect of viscous damping or frictional damping through expansion and contraction of the elastic body 82, the level of vibrations of the vehicle seat 70 alone may be reduced.

Figure 14:
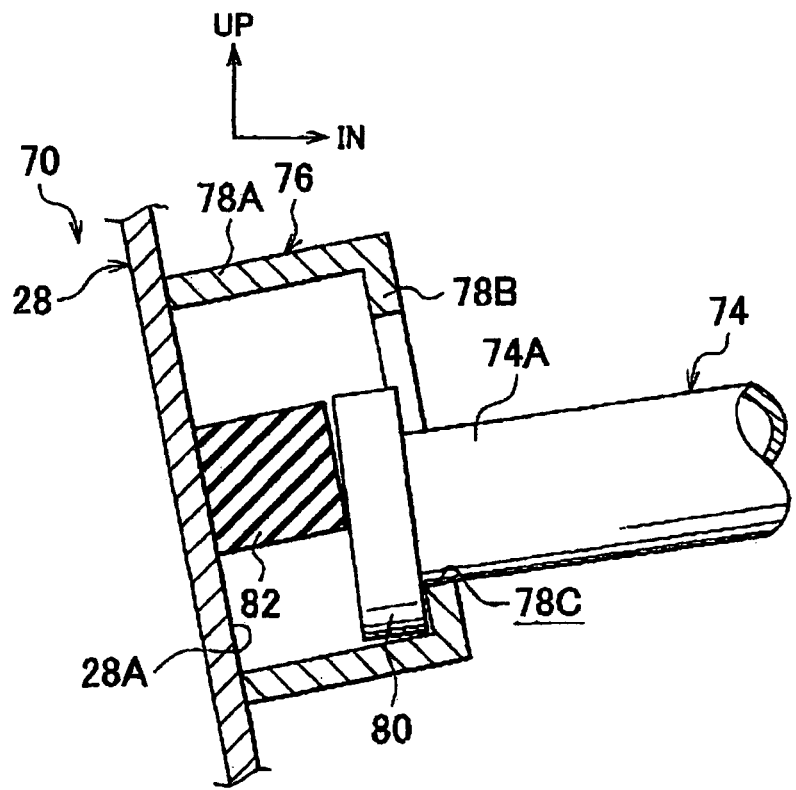
FIG. 14 is a longitudinal sectional view showing a state of a rod receiving portion, the rod, and the lower frame in the major displacement range.

However, as shown in FIGS. 13 and 14, if the seat frame is displaced by such an amount that the displacement of the seat frame cannot be absorbed through deformation of the elastic body 82 (i.e., the amount is in the major displacement range), the elastic body 82 is deformed to its limit or ruptured, and the stopper 80 on the rod 74 directly or indirectly abuts on the inner lateral face 28A of the lower frame 28 or on the erected portion 78A and the protrusion portion 78B (via the elastic body 82 deformed to its limit). For example, as shown in FIG. 14, the stopper 80 on the rod 74 is meshed with the protrusion portion 78B, and the abutment of the stopper 80 on the rod 74 and the rod-receiving portion 76 on each other is ensured. Thus, the rigidity of the seat frame can be increased in the major displacement range.

Thus, it is possible to ensure both sufficient rigidity of the seat frame in the major displacement range in the event of a collision or the like and a reduction in the level of minor vibrations of the vehicle seat 70 in the minor displacement range.

The fourth embodiment of a vehicle seat according to the invention will be described hereinafter using FIG. 15. Components identical to those of the first, second, or third embodiment of the invention will be denoted by the same reference numerals and will not be described below.

Figure 15:
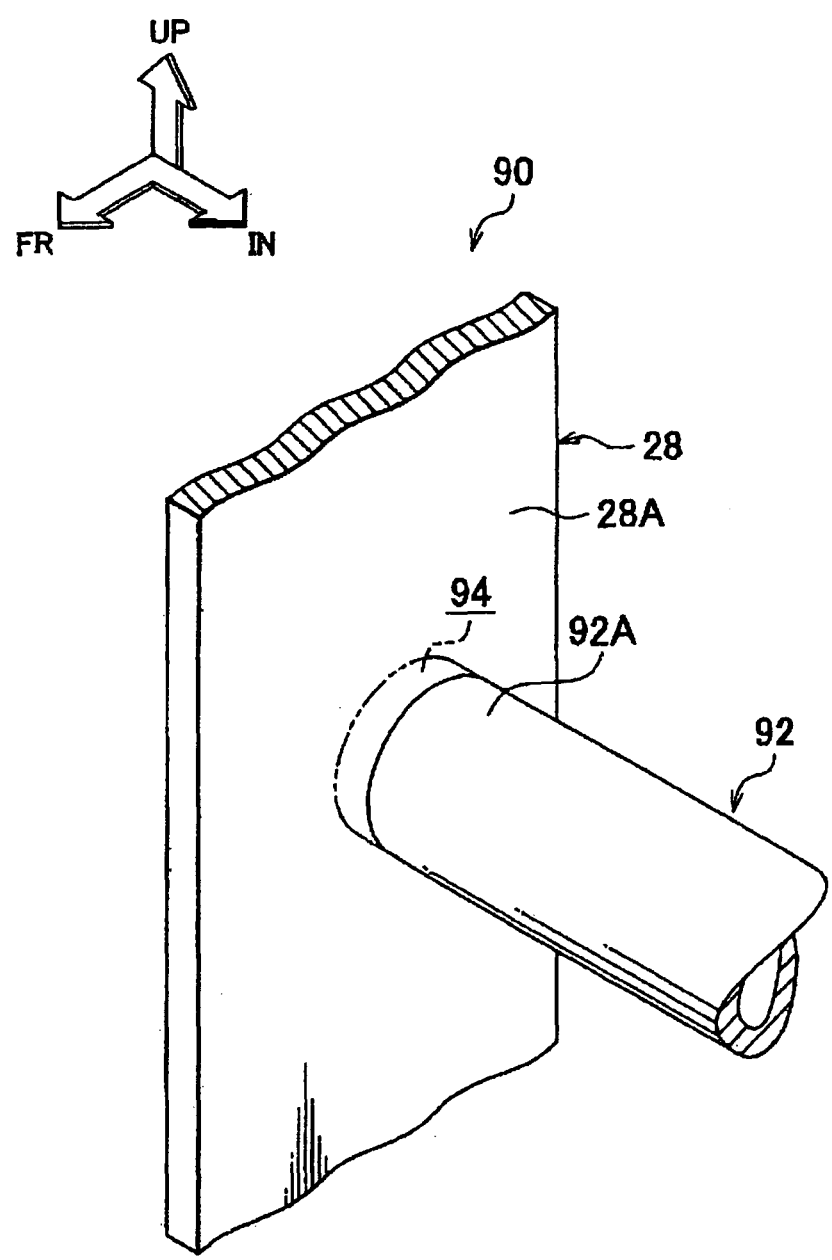
FIG. 15 is a perspective view showing a structure of a rod and a lower frame of a seatback frame in a vehicle seat according to the fourth embodiment of the invention.

As shown in FIG. 15, in a vehicle seat 90, a clearance 94 formed between an end face of one end 92A of a rod 92 and the inner lateral face 28A of the lower frame 28 serves as a minor vibration damping portion, and the other end (not shown) of the rod 92 is joined to the inner lateral face 28A of the lower frame 28 (see a joint portion shown in, for example, FIG. 3). In other words, the rod 92 is cantilevered on the inner lateral face 28A of the lower frame 28. This vehicle seat 90 is constructed by being provided with the clearance 94 instead of the elastic body 34 shown in FIG. 3.

Next, the operation and effect of this embodiment of the invention will be described.

In the vehicle seat 90, when the seat frame is displaced by a small amount (in the minor displacement range), the clearance 94, which functions as a buffering portion, increases or decreases to absorb the displacement of the seat frame. The level of minor vibrations is thereby reduced. That is, in the minor displacement range, almost no increase in the rigidity of the seat frame results from an increase or decrease in the clearance 94, and the resonance frequency of the vehicle seat 90 is restrained from increasing. Thus, the vehicle seat 90 may be prevented from vibrating sympathetically with the vehicle (not shown). As a result, the vehicle seat 90 is restrained from vibrating sympathetically with the vehicle to cause aggravated vibrations.

However, in the major displacement range in the event of a collision or the like, the clearance 94 ceases to exist, and one end 92A of the rod 92 and the inner lateral face 28A of the lower frame 28 abut each other. Thus, the rigidity of the seat frame may be raised in the major displacement range.

Thus, it is possible to ensure both sufficient rigidity of the seat frame in the major displacement range in the event of a collision or the like and a reduction in the level of minor vibrations of the vehicle seat 90 in the minor displacement range.

The fifth embodiment of a vehicle seat according to the invention will be described hereinafter using FIGS. 16 and 17. Components identical to those of the first, second, third, or fourth embodiment of the invention will be denoted by the same reference numerals and will not be described below.

Figure 16:
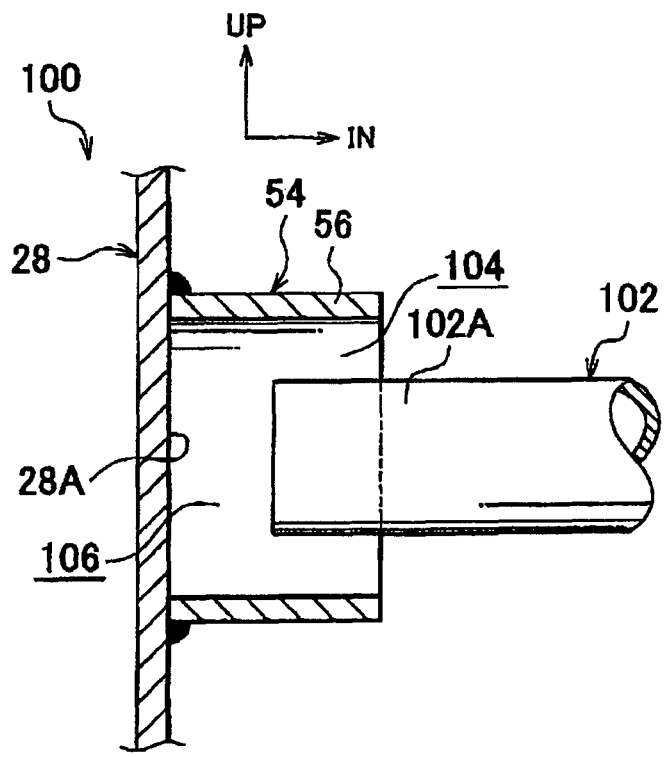
FIG. 16 is a longitudinal sectional view showing a structure of a rod receiving portion, a rod, and a lower frame of a seatback frame in a vehicle seat according to the fifth embodiment of the invention.
Figure 17:
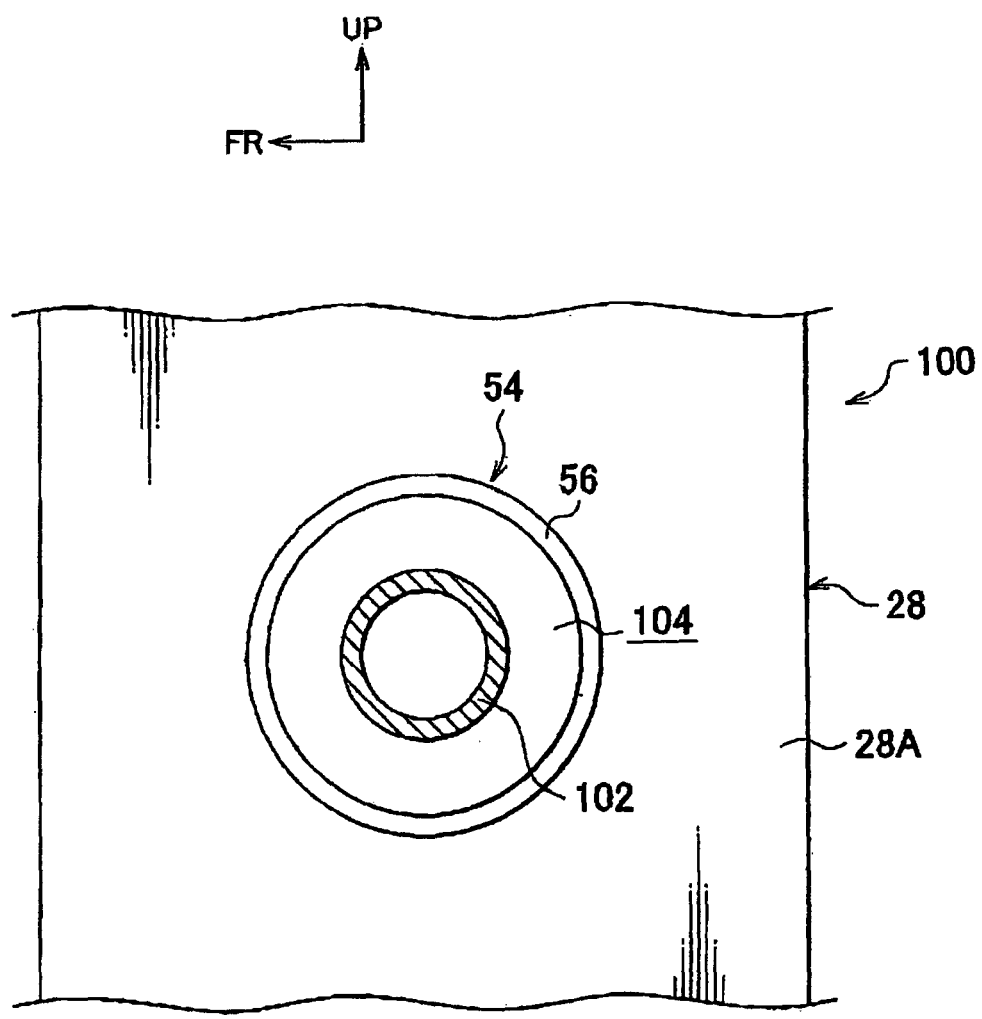
FIG. 17 is a lateral sectional view showing a structure of the rod receiving portion, the rod, and the lower frame of the seatback frame in the vehicle seat according to the fifth embodiment of the invention.

As shown in FIGS. 16 and 17, in a vehicle seat 100, the lower rod 28 is provided with the rod receiving portion 54 for receiving one end 102A of a rod 102. Clearances 104 and 106, which serve as minor vibration damping portions, are formed between a peripheral face of the end 102A of the rod 102 and the erected portion 56, and between an end face of the end 102A of the rod 102 and the inner lateral face 28A respectively. The other end (not shown) of the rod 102 is joined to the inner lateral face 28A of the lower frame 28 (see the joint portion shown in, for example, FIG. 3). In other words, the rod 102 is cantilevered on the inner lateral face 28A of the lower frame 28.

Next, the operation and effect of this embodiment of the invention will be described.

In the vehicle seat 100, when the seat frame is displaced by a small amount (in the minor displacement region), the clearances 104 and 106, which function as buffering portions, increase or decrease to absorb the displacement of the seat frame. The level of minor vibrations is thereby be reduced. That is, in the minor displacement range, almost no increase in the rigidity of the seat frame results from changes in the clearances 104 and 106, and the resonance frequency of the vehicle seat 100 is restrained from increasing. Thus, the vehicle seat 100 is prevented from vibrating sympathetically with the vehicle (not shown) and thereby aggravating vibrations.

In contrast, in the major displacement range in the event of a collision or the like, the clearance 104 or the clearance 106 ceases to exist, and the end 102A of the rod 102 and the erected portion 56 or the inner lateral face 28A of the lower frame 28 abut on each other. In this case, because the rod receiving portion 54 is provided, the end 102A of the rod 102 is prevented from separating from the lower frame 28, and the abutment of the end 102A of the rod 102 and the rod receiving portion 54 on each other is ensured. Thus, the rigidity of the seat frame in the major displacement range may be enhanced.

Thus, it is possible to ensure sufficient rigidity of the seat frame in the major displacement range in the event of a collision or the like and to reduce the level of minor vibrations of the vehicle seat 100 in the minor displacement range.

The sixth embodiment of a vehicle seat according to the invention will be described below using FIG. 18. Components identical to those of the first, second, third, fourth, or fifth embodiments of the invention will be denoted by the same reference numerals and will not be described below.

Figure 18:
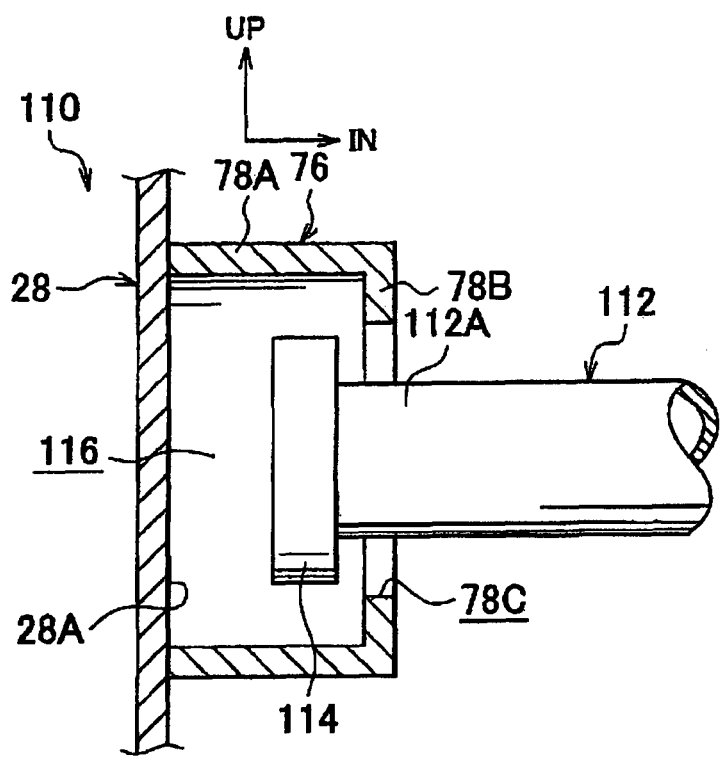
FIG. 18 is a longitudinal sectional view showing a structure of a rod receiving portion, a rod, and a lower frame of a seatback frame in a vehicle seat according to the sixth embodiment of the invention.

As shown in FIG. 18, in a vehicle seat 110, the lower frame 28 is provided with the rod receiving portion 76 that receives one end 112A of a rod 112. A circular flange portion is provided at the end 112A of the rod 112 as a stopper 114. A clearance 116 as a minor vibration damping portion is formed between the stopper 114 and the inner lateral face 28A of the lower frame 28, and the other end (not shown) of the rod 112 is joined to the inner lateral face 28A of the lower frame 28 (see the joint portion shown in, for example, FIG. 3). In other words, the rod 112 is cantilevered on the inner lateral face 28A of the lower frame 28.

Next, the operation and effect of this embodiment of the invention will be described.

In the vehicle seat 110, when the seat frame is displaced by a small amount (in the minor displacement region), the clearance 116, which functions as a buffering portion, increases or decreases to absorb the displacement of the seat frame. The level of minor vibrations can thereby be reduced. That is, in the minor displacement range, almost no increase in the rigidity of the seat frame results from an increase or decrease in the clearance 116, and the resonance frequency of the vehicle seat 110 is restrained from rising. Thus, the vehicle seat 110 is prevented from vibrating sympathetically with the vehicle and thereby aggravating vibrations.

However, in the major displacement range, the stopper 114 on the rod 112 abuts the inner lateral face 28A of the lower frame 28 or on the erected portion 78A and the protrusion portion 78B. For example, the stopper 114 on the rod 112 meshes with the protrusion portion 78B, and the abutment of the stopper 114 on the rod 112 and the rod-receiving portion 76 on each other is ensured. Also, the stopper 114 on the rod 112 is prevented from separating from the rod-receiving portion 76. Thus, the rigidity of the seat frame in the major displacement range may be enhanced.

Thus, it is possible to ensure both sufficient rigidity of the seat frame in the major displacement range in the event of a collision or the like and to reduce in the level of minor vibrations of the vehicle seat 110 in the minor displacement range.

(1) In the first, second, or third embodiment of the invention, the elastic body is interposed between one end of the rod and the lower frame 28 or the rod-receiving portion. However, a construction in which an elastic body is interposed between the other end of the rod and the lower frame 28 or the rod receiving portion or one in which elastic bodies are interposed between both the ends of the rod and the lower frame 28 or the rod receiving portion may also be adopted. For example, in the first embodiment of the invention, the elastic body 34 may instead be interposed between the other end 30B of the rod 30 and the lower frame 28, or between each of both the ends of the rod 30 and the lower frame 28.

(2) In the first, second, or third embodiment of the invention, the elastic body is provided at the end of the rod. However, a construction may also be adopted in which one, two, or more elastic bodies are provided at an intermediate portion of the rod. Thus, the level of minor vibrations of the vehicle seat in the minor displacement range may be reduced. Also, in the major displacement range, the elastic body at the intermediate portion is deformed to its limit, or the elastic bodies at the intermediate portion are deformed to their limits, and the end faces of the rod indirectly abut on each other. Thereby increasing the rigidity of the vehicle seat.

(3) In the first embodiment of the invention, the two rods 30, 32 are provided. However, It would be better to state "the number of reinforcing rods is not restricted to two; instead any number of rods may be used as appropriate. Further, in the first, second, or third embodiment of the invention, the elastic body is provided on the single rod for reinforcement. However, a construction in which elastic bodies are provided on a plurality of rods for reinforcement may also be adopted. For example, in the first embodiment of the invention, an elastic body may be interposed between the end of the upper rod 32 and the lower frame 28 or be provided at the intermediate portion of the rod 32.

Figure 19:
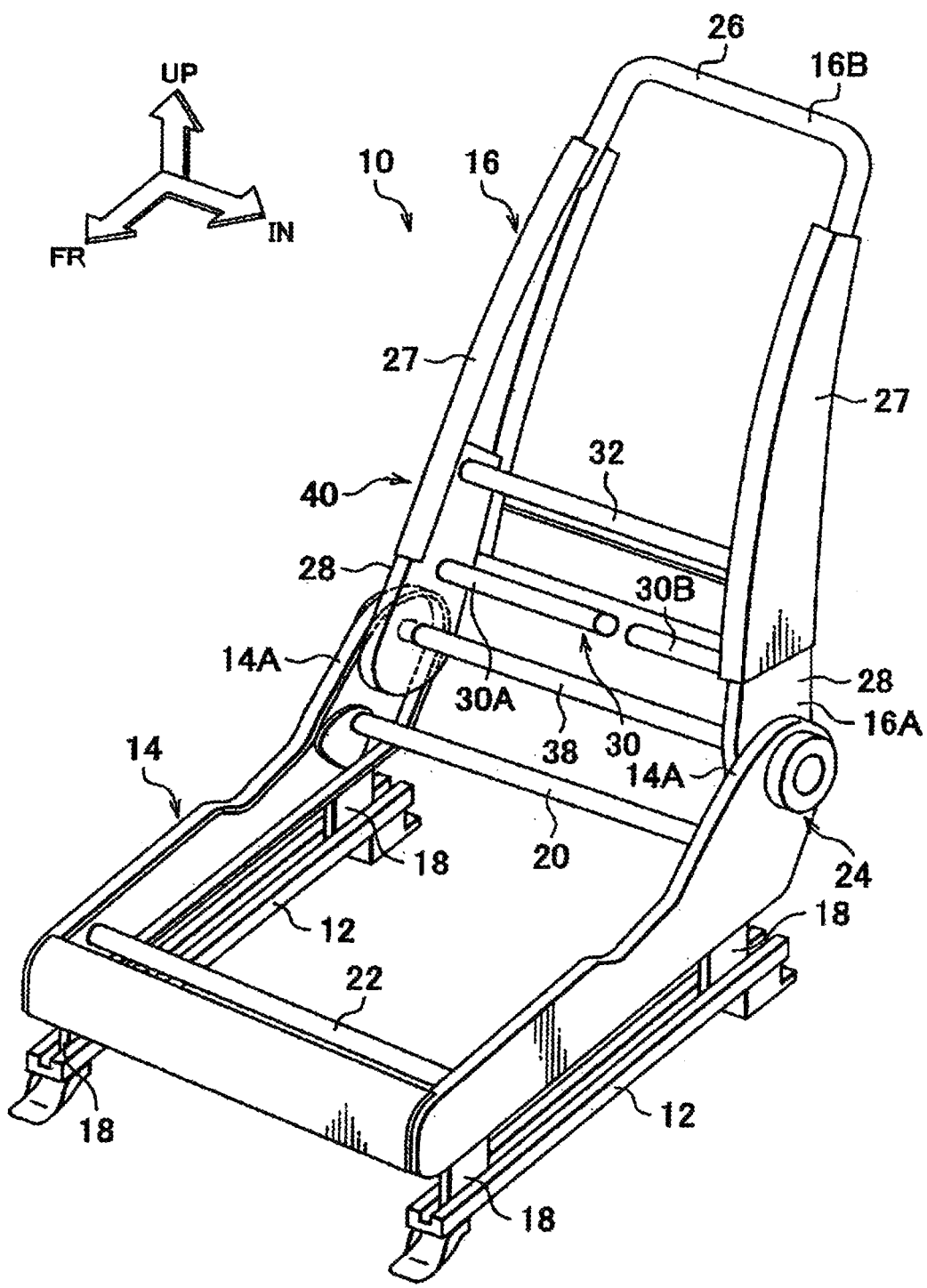
FIG. 19 is a perspective view of a vehicle seat according to a modified embodiment of the invention.

(4) In the fourth, fifth, or sixth embodiment of the invention, one end of the rod for reinforcement is provided with the clearance. However, a construction in which both the ends of the rod for reinforcement are joined to the sub-frame, and the intermediate portion of the rod is provided with a clearance may also be adopted, as shown in FIG. 19.

(5) In the fourth, fifth, or sixth embodiment of the invention, the single rod for reinforcement is provided with the clearance. However, a construction in which a plurality of rods for reinforcement are provided with clearances respectively may also be adopted.

(6) In each of the embodiments of the invention, the seatback frame is provided with the rods according to the invention along the width direction of the vehicle. However, the invention is not limited to this construction. For example, the rod according to the invention may be provided at an incline within the seat frame.

(7) In each of the embodiments of the invention, the seatback frame is provided with the rods according to the invention. However, the invention is not limited to this construction. The seat cushion frame may also be provided with the rods according to the invention.

In each of the described embodiments of the invention, rods having a circular cross-section are used to reinforce the vehicle seat. However, rods having an elliptical or angular cross-section may also be used. As long as the rods function as reinforcing members, any suitable cross-sectional shape may be used.

The invention claimed is:

1. A vehicle seat comprising:
   a seat frame having a sub-frame and a cantilevered rod provided between certain regions of the sub-frame;
   a minor vibration damping portion that is configured to maintain rigidity of the seat frame when the seat frame is displaced by a large amount and to suppress an increase in rigidity of the seat frame when the seat frame is displaced by a small amount, which thereby reduces a level of minor vibrations;

wherein the minor vibration damping portion is constructed such that the rod and the sub-frame or intermediate portions of the rod are spaced apart from each other when the seat frame is displaced by the small amount, the rod and the sub-frame or the intermediate portions of the rod directly abut on each other when the seat frame is displaced by the large amount; and the minor vibration damping portion is constructed as a clearance provided between a tip of the rod and the sub-frame or between the intermediate portions of the rod.

2. The vehicle seat according to claim 1, wherein the minor vibration damping portion is a buffering portion between the tip of the rod and the sub-frame or between the intermediate portions of the rod and the sub-frame.

3. The vehicle seat according to claim 1, wherein the sub-frame is equipped with a rod-receiving portion that receives the tip of the rod, and the clearance is formed between the tip of the rod and the rod-receiving portion.

4. The vehicle seat according to claim 3, wherein the rod-receiving portion is equipped with an erected portion that is erected from the sub-frame and surrounds a periphery of the rod.

5. The vehicle seat according to claim 4, wherein the erected portion is equipped with a protrusion portion that protrudes inward, and the rod is provided with a stopper that meshes with the protrusion portion.

6. The vehicle seat according to claim 1, further comprising:
   a seat cushion that supports a seated passenger's hips and thighs; and
   a seatback that is provided on the rear side of the seat cushion, and that supports the seated passenger's back,
   wherein the sub-frame is provided on the seatback, and the rod is disposed to extend between certain regions of the sub-frame in a width direction of a vehicle.

7. The vehicle seat according to claim 1, wherein the seat frame is displaced by the large amount in an event of a vehicle collision, and the seat frame is displaced by the small amount during normal operation of the vehicle.

8. A vehicle seat comprising:
   a seat frame composed of a sub-frame and a rod provided between certain regions of the sub-frame; and
   a minor vibration damping portion that is provided on the rod to maintain rigidity of the seat frame when the seat frame is displaced by a large amount and to suppress an increase in rigidity of the seat frame when the seat frame is displaced by a small amount, which thereby reduces a level of minor vibrations,
   wherein the minor vibration damping portion is constructed so that the rod and the sub-frame are spaced apart from each other when the seat frame is displaced by the small amount, and that the rod and the sub-frame abut on each other when the seat frame is displaced by the large amount,
   the sub-frame is equipped with a rod-receiving portion for receiving at least one end of the rod, and
   the minor vibration damping portion is constructed as an elastic body that is sandwiched between the end of the rod and the rod-receiving portion.

9. The vehicle seat according to claim 8, wherein the rod-receiving portion is equipped with an erected portion that is erected from the sub-frame and surrounds a periphery of the rod.

10. The vehicle seat according to claim 9, wherein the erected portion is equipped with a protrusion portion that protrudes inward, and the rod is provided with a stopper that meshes with the protrusion portion.

\* \* \* \* \*